(12) United States Patent
Kim

(10) Patent No.: US 10,704,670 B2
(45) Date of Patent: Jul. 7, 2020

(54) AUTOMOTIVE TRANSMISSION

(71) Applicant: SL Corporation, Daegu (KR)

(72) Inventor: Daehyung Kim, Daegu (KR)

(73) Assignee: SL Corporation, Daegu (KR)

( * ) Notice: Subject to any disclaimer, the term of this patent is extended or adjusted under 35 U.S.C. 154(b) by 277 days.

(21) Appl. No.: 15/912,008

(22) Filed: Mar. 5, 2018

(65) Prior Publication Data
US 2019/0195339 A1 Jun. 27, 2019

(30) Foreign Application Priority Data

Dec. 22, 2017 (KR) ........................ 10-2017-0178231

(51) Int. Cl.
| | | |
|---|---|---|
| *F16H 59/02* | (2006.01) | |
| *F16H 59/04* | (2006.01) | |
| *F16H 59/10* | (2006.01) | |
| *F16H 61/24* | (2006.01) | |
| *F16H 59/08* | (2006.01) | |
| *F16H 25/20* | (2006.01) | |

(52) U.S. Cl.
CPC ....... *F16H 59/0204* (2013.01); *F16H 59/044* (2013.01); *F16H 59/105* (2013.01); *F16H 61/24* (2013.01); *F16H 25/20* (2013.01); *F16H 2059/026* (2013.01); *F16H 2059/0221* (2013.01); *F16H 2059/081* (2013.01); *F16H 2061/247* (2013.01)

(58) Field of Classification Search
CPC ............... F16H 2059/081; F16H 25/20; F16H 2059/0221; F16H 2059/026; F16H 59/10; F16H 59/0278; F16H 2059/082
See application file for complete search history.

(56) References Cited

U.S. PATENT DOCUMENTS

| | | | | |
|---|---|---|---|---|
| 5,497,673 A | * | 3/1996 | Kataumi | F16H 59/10 29/434 |
| 6,427,553 B1 | * | 8/2002 | Hogberg | F16H 59/0204 200/5 R |
| 6,601,685 B2 | * | 8/2003 | Nagasaka | B60K 37/06 192/218 |
| 8,955,405 B2 | * | 2/2015 | Heo | F16H 59/04 74/473.18 |
| 9,322,469 B2 | * | 4/2016 | Kim | F16H 59/08 |
| 9,494,228 B2 | * | 11/2016 | Hermansson | F16H 59/0204 |
| 10,234,022 B2 | * | 3/2019 | Kim | F16H 59/12 |
| 2016/0290495 A1 | * | 10/2016 | Bak | F16H 59/105 |

* cited by examiner

*Primary Examiner* — Jake Cook
*Assistant Examiner* — Gregory Robert Weber
(74) *Attorney, Agent, or Firm* — Nelson Mullins Riley & Scarborough LLP; Kongsik Kim, Esq.

(57) ABSTRACT

An automotive transmission is provided that allows a driver to select a gear stage. The automotive transmission includes a knob and a lever that is vertically movable from a first position to a second position. A lever moving unit is coupled to the lever and a driving unit generates a driving force to move the lever moving unit. Additionally, the lever moving unit moves the lever between the first position, which is for operating the lever in a first gear shift sensing mode, and the second position, which is for operating the lever in a second gear shift sensing mode, in accordance with the driving force generated by the driving unit.

18 Claims, 17 Drawing Sheets

AUTOMOTIVE TRANSMISSION

CROSS-REFERENCE TO RELATED APPLICATION(S)

This application claims priority to Korean Application No. 10-2017-0178231, filed on Dec. 22, 2017, the disclosure of which is incorporated herein by reference in its entirety.

TECHNICAL FIELD

The present invention relates to an automotive transmission, and more particularly, to an automotive transmission that allows a driver to select a gear stage.

RELATED ART

In general, a transmission may have different gear ratios to constantly maintain a rotation of an engine based on the speed of a vehicle, and a driver is capable of changing the gear ratio of the transmission by operating a gear shift lever. A gear shift mode of the transmission may be classified into a manual gear shift mode in which the driver manually changes the gear ratio and an automatic gear shift mode in which the gear ratio is automatically changed based on the speed of the vehicle when the driver selects a drive (D) stage.

Further, another type of transmission includes a sports mode type transmission which is capable of performing the manual gear shift operation and the automatic gear shift operation in a single transmission. In the sports mode type transmission, a transmission capable of performing the manual gear shift operation may be disposed next to a transmission that performs the automatic gear shift operation to allow the driver to perform the manual gear shift operation by raising or lowering the number of gear stages, while performing the automatic gear shift operation.

The gear shift lever is exposed on the inside of the vehicle to be operable by the driver, and is generally disposed between the center fascia and the console box of the vehicle. Since the gear shift lever is generally of a joystick type and a gear stage is selected by moving the gear shift lever in forward and backward directions, a space needs to be provided and designed in consideration of the trajectory of the movement of the gear shift lever to prevent the movement of the gear shift lever from interfering with the surroundings of the gear shift lever. Generally, a gear shift operation may be performed in a rotary mode, thereby reducing the space required and increasing the space utilization of the vehicle.

However, since a preferred operation mode may differ based on a driver and based on different driving propensities, there is the need to provide various operation modes to allow each driver to select a preferred operation mode in accordance with preferred driving conditions.

SUMMARY

The present invention provides an automotive transmission capable of providing various operation modes to a driver for the driver to select a preferred operation mode in accordance with the driving conditions of the vehicle. However, exemplary embodiments of the present invention are not restricted to those set forth herein. The above and other exemplary embodiments of the present invention will become more apparent to one of ordinary skill in the art to which the present invention pertains by referencing the detailed description of the present invention given below.

According to an exemplary embodiment of the present invention, an automotive transmission may include: a knob; a lever vertically movable from a first position to a second position; a lever moving unit coupled to the lever; and a driving unit configured to generate a driving force to move the lever moving unit. The lever moving unit may be configured to move the lever between the first position, which is for operating the lever in a first gear shift sensing mode, and the second position, which is for operating the lever in a second gear shift sensing mode based on the driving force generated by the driving unit. According to the aforementioned and other exemplary embodiments of the present invention, various operation modes may be provided to a driver, and thus, the driver may select and use a preferred operation mode in accordance with the driving conditions of the vehicle. As a result, the driver's convenience may be improved.

Other features and exemplary embodiments may be apparent from the following detailed description, the drawings, and the claims.

BRIEF DESCRIPTION OF THE DRAWINGS

The above and other exemplary embodiments and features of the present invention will become more apparent by describing in detail exemplary embodiments thereof with reference to the attached drawings, in which.

DETAILED DESCRIPTION

Figure 1:
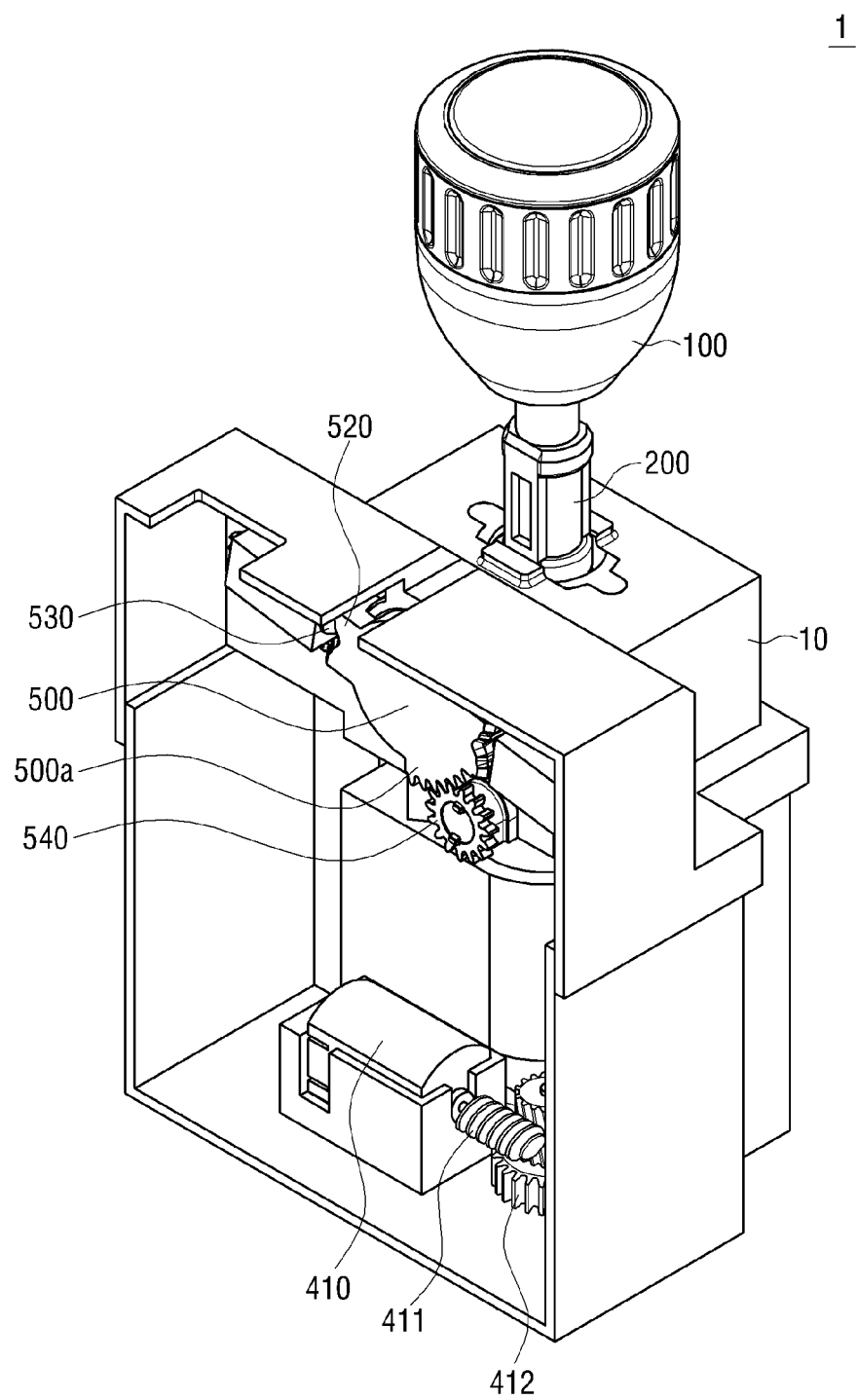
FIG. 1 is a perspective view illustrating the exterior of an automotive transmission according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The aspects and features of the present invention and methods for achieving the aspects and features will be apparent by referring to the exemplary embodiments to be described in detail with reference to the accompanying drawings. However, the present invention is not limited to the exemplary embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

Accordingly, in some exemplary embodiments, well-known processes, structures, and technologies are not described in detail since they would obscure the invention in unnecessary detail. In the following description of the present invention, the terms used are for explaining exemplary embodiments of the present invention, but do not limit the scope of the present invention.

In the following description of the present invention, exemplary embodiments of the present invention will be described with reference to plane views and sectional views which are ideal schematic views. The form of exemplary views may be modified due to the manufacturing techniques and/or allowable errors. Accordingly, the exemplary embodiments of the present invention are not limited to their specified form as illustrated, but include changes in form being produced according to manufacturing processes. In the drawings, sizes and relative sizes of layers and areas may be exaggerated for clarity in explanation. In the entire description of the present invention, the same drawing reference numerals are used for the same elements across various figures.

Figure 2:
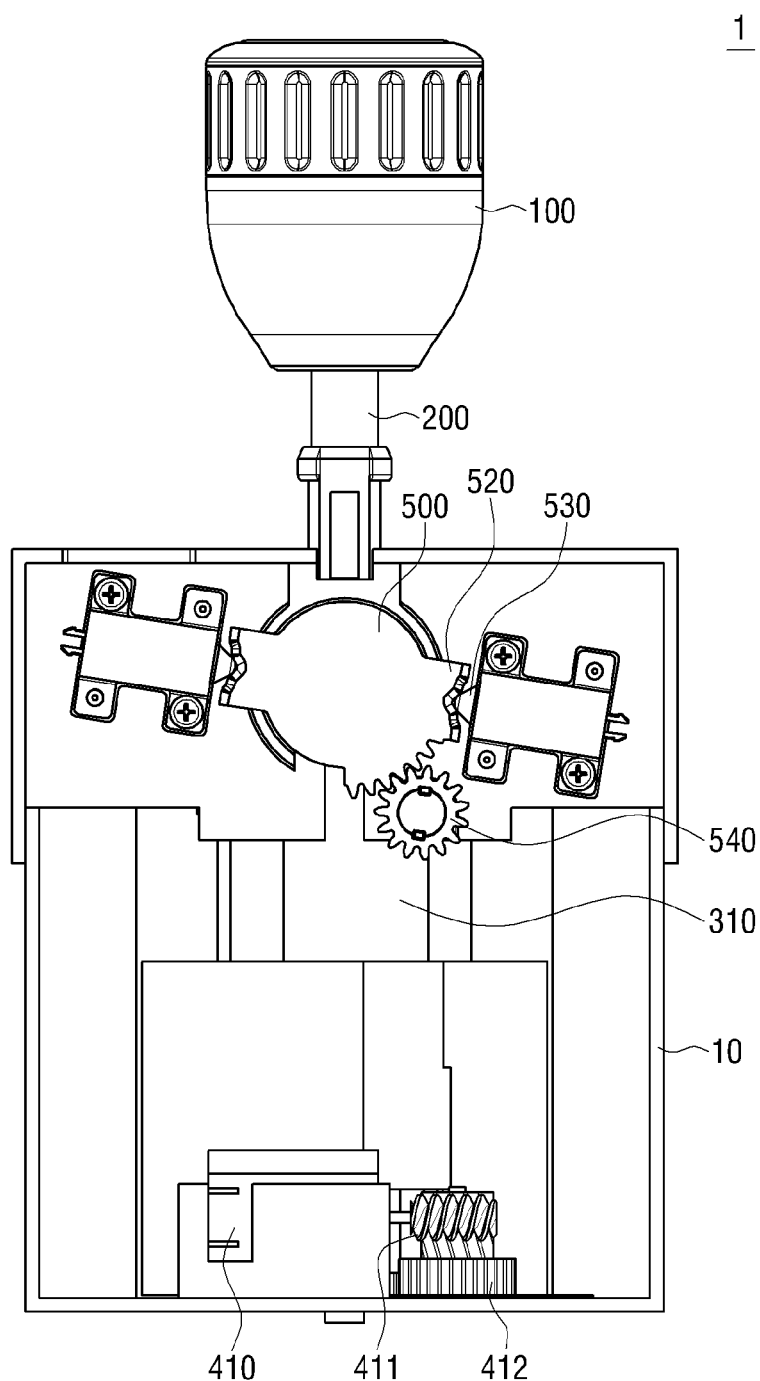
FIG. 2 is a side view illustrating the exterior of the automotive transmission according to the exemplary embodiment of FIG. 1.
Figure 3:
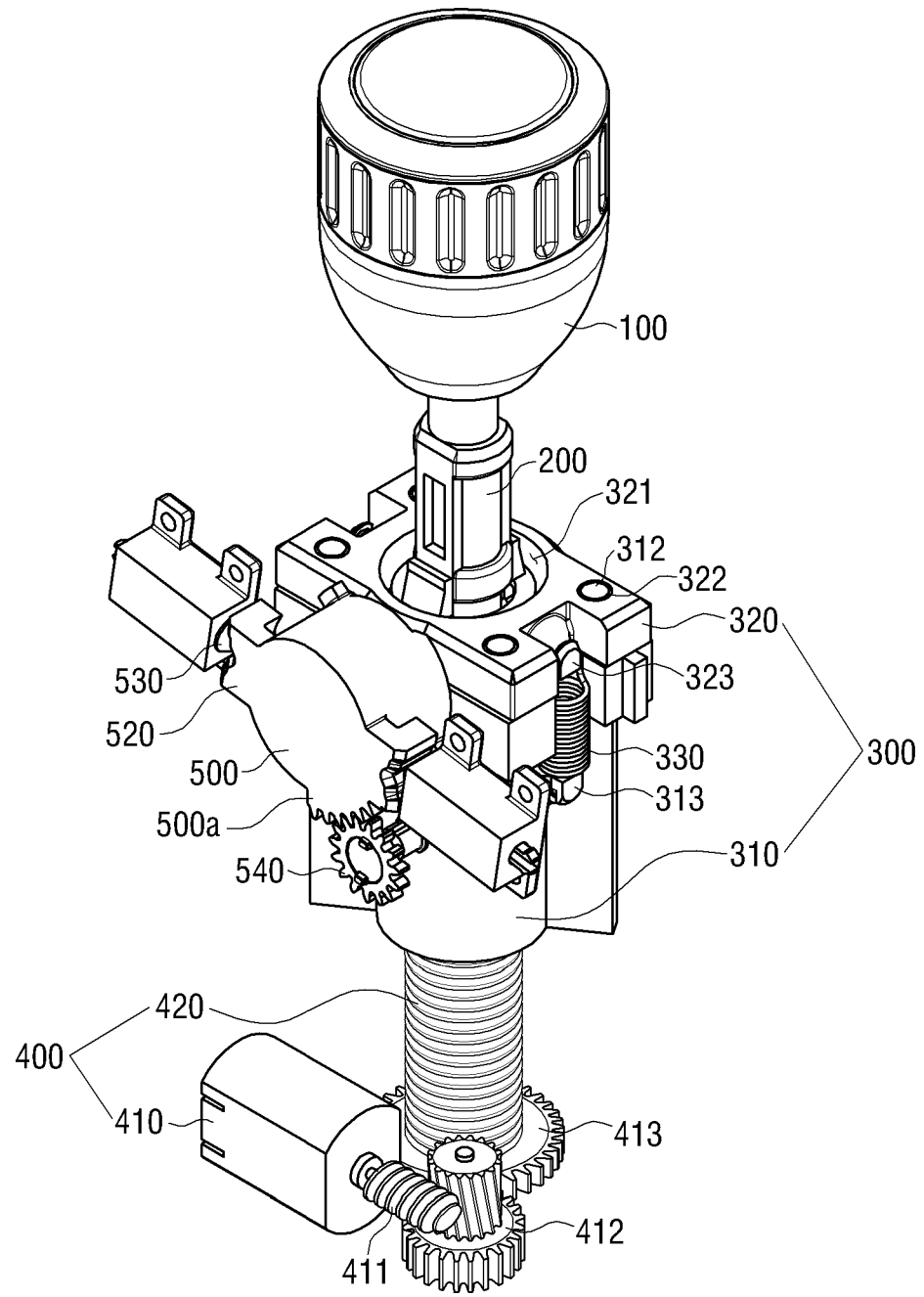
FIG. 3 is a perspective view of the automotive transmission according to the exemplary embodiment of FIG. 1.
Figure 4:
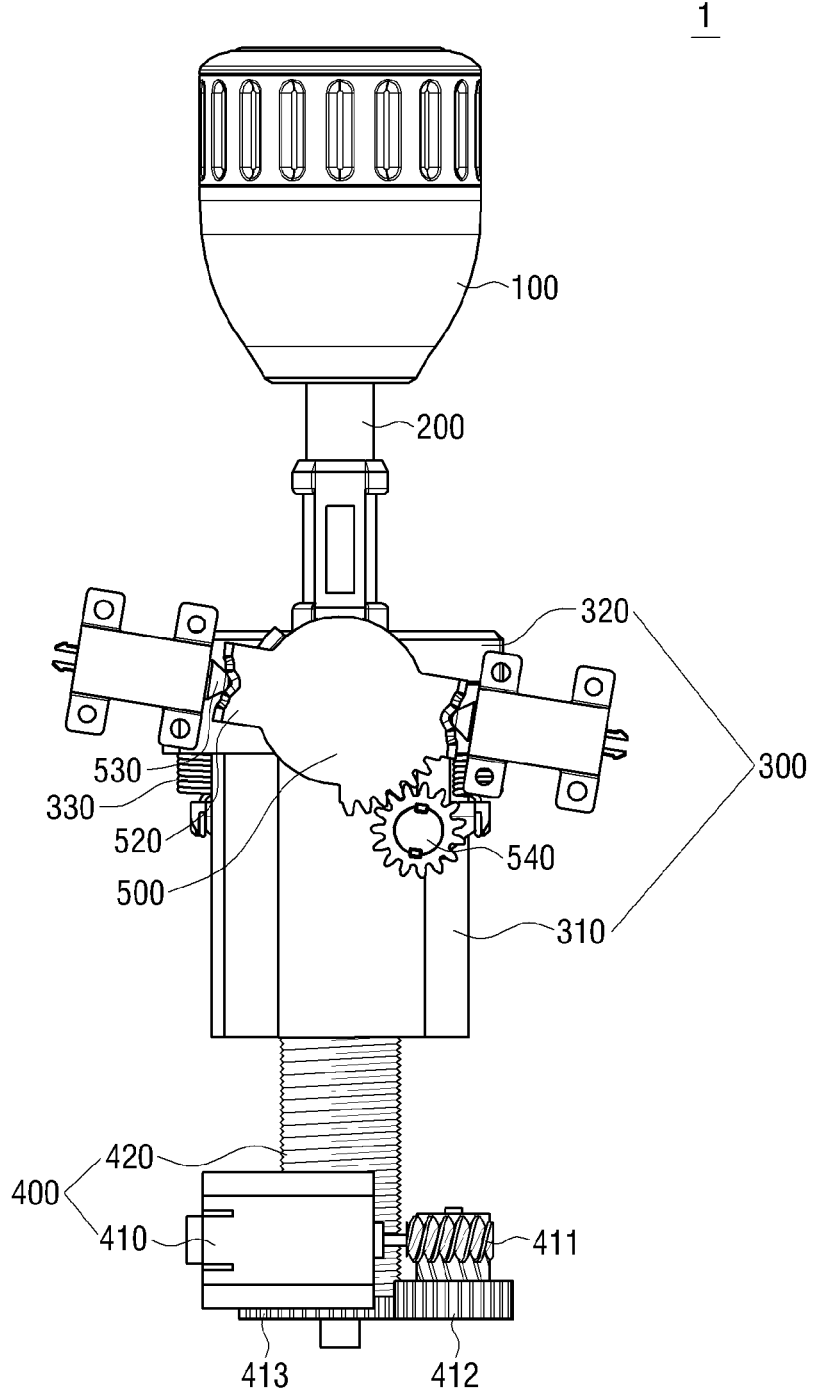
FIG. 4 is a side view of the automotive transmission according to the exemplary embodiment of FIG. 1.
Figure 5:
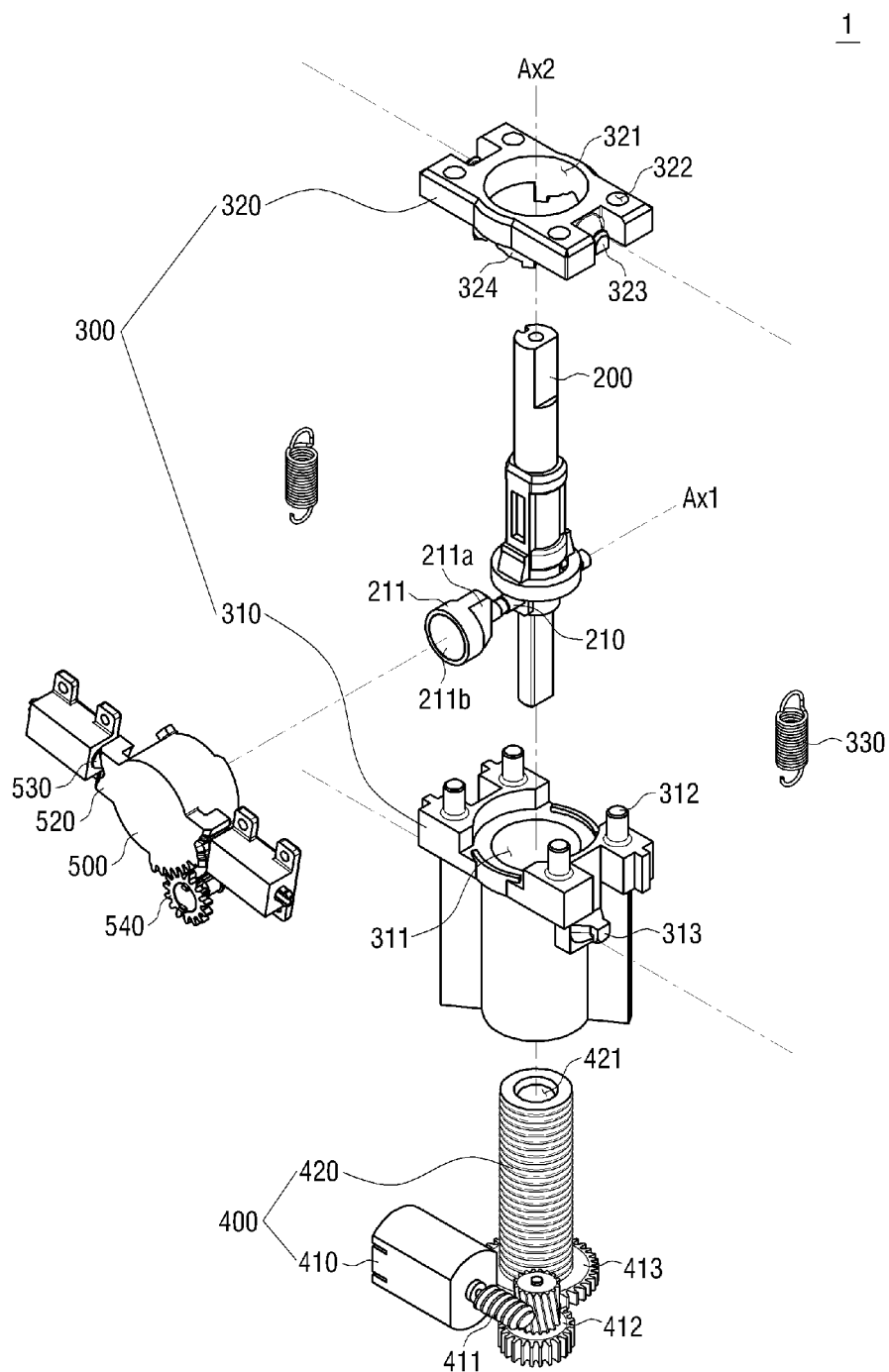
FIGS. 5 through 7 are detailed perspective views of the automotive transmission according to the exemplary embodiment of FIG. 1.
Figure 6:
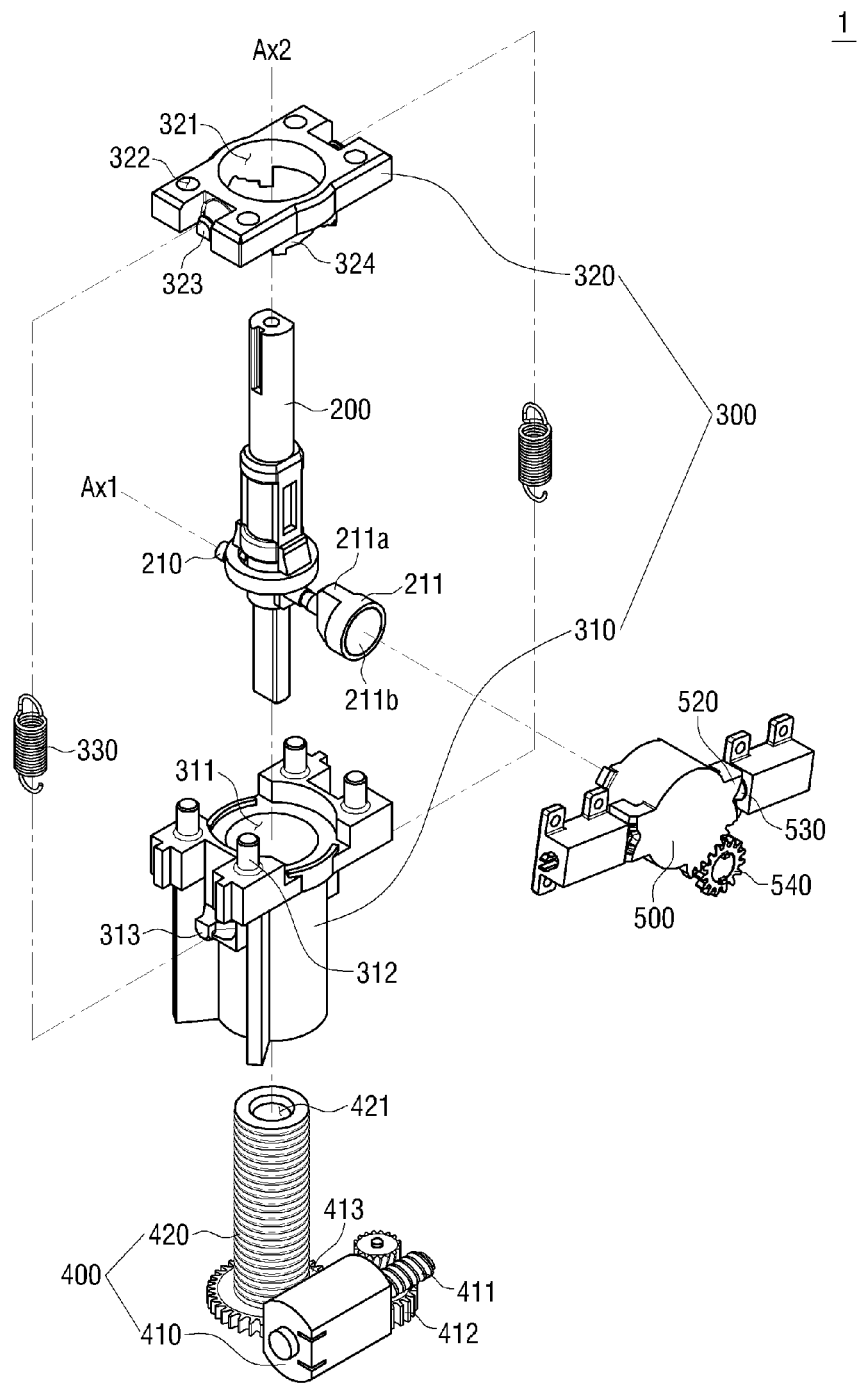
Figure 7:
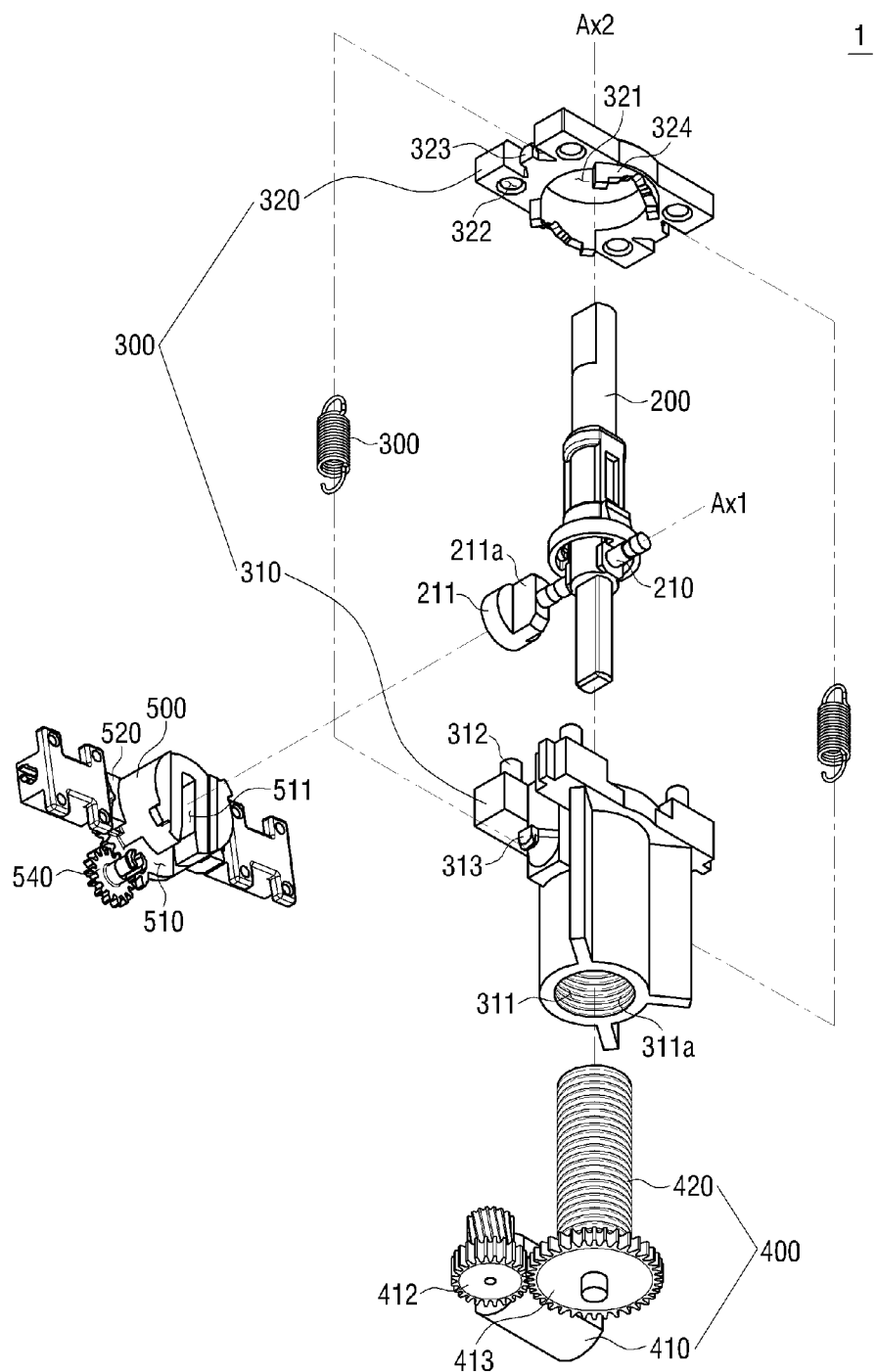

An automotive transmission according to an exemplary embodiment of the present invention will hereinafter be described with reference to the accompanying drawings. FIG. 1 is a perspective view illustrating the exterior of an automotive transmission according to an exemplary embodiment of the present invention, FIG. 2 is a side view illustrating the exterior of the automotive transmission according to the exemplary embodiment of FIG. 1, FIG. 3 is a perspective view of the automotive transmission according to the exemplary embodiment of FIG. 1, FIG. 4 is a side view of the automotive transmission according to the exemplary embodiment of FIG. 1, and FIGS. 5 through 7 are detailed perspective views of the automotive transmission according to the exemplary embodiment of FIG. 1. For convenience, some of the elements of the automotive transmission according to the exemplary embodiment of FIG. 1 are not illustrated in FIGS. 3 through 7.

Referring to FIGS. 1 through 7, an automotive transmission 1 may include a knob 100, a lever 200, a lever moving unit 300, and a driving unit 400. At least some of the knob 100, the lever 200, the lever moving unit 300, and the driving unit 400 may be accommodated in a housing 10 to be protected from external impact or may be fixedly installed in the housing 10.

In particular, the knob 100 may be coupled to one end of the lever 200 and may thus operate as a handle. The driver may select a gear stage by grasping and moving the knob to manipulate the lever 200. The gear stage that may be selected by manipulating the lever 200 may be a reverse (R) stage, a neutral (N) stage, or a drive (D) stage, but the present disclosure is not limited thereto. In other words, the gear stage that may be selected by manipulating the lever 200 may vary. The knob 100 may operate as a handle, but the present disclosure is not limited thereto and the knob 100 may be provided with various elements necessary for performing a gear shift operation, such as a release button (not illustrated) for releasing a shift lock.

Further, the lever 200 may be operated in at least one gear shift sensing mode to select a gear stage. A gear stage may be selected by operating the lever 200 in a first gear shift sensing mode, in which the lever 200 is rotated about a rotational axis Ax1 (hereinafter, the first rotational axis Ax1) perpendicular to the lengthwise direction of the lever 200, or a second gear shift sensing mode, in which the lever 200 is rotated about a rotational axis Ax2 (hereinafter, the second rotational axis Ax2) parallel to the lengthwise direction of the lever 200. The first gear shift sensing mode may be understood as being a joystick mode in which the lever 200 is rotated about the first rotational axis Ax1 in response to the driver manipulating the knob 100 in forward and backward directions, and the second gear shift sensing mode may be understood as being a rotary mode in which the lever 200 is rotated about the second rotational axis Ax2 in response to the driver rotating the knob 100.

The lever moving unit 300 may be coupled to the lever 200 and may thus be moved by a driving force generated by the driving unit 400. The lever moving unit 300 may allow the lever 200 to be movable between a first position for the first gear shift sensing mode and a second position for the second gear shift sensing mode. The lever moving unit 300 may be moved in a vertical direction by the driving force generated by the driving unit 400. Specifically, the lever 200 may be elevated to the first position when operated in the first gear shift sensing mode and may be lowered to the second position when operated in the second gear shift sensing mode.

The lever moving unit 300 may include a moving portion 310, which is moved by the driving force generated by the driving unit 400, and a fixing portion 320, which is coupled to the moving portion 310 and allows the lever 200 to be coupled to the lever moving unit 300. A hollow 311 (e.g., a hollow passageway) may be formed in the moving portion 310, and a hollow 321 (e.g., a hollow passageway) may be formed in the fixing portion 320. The moving portion 310 and the fixing portion 320 may be coupled to each other in the lengthwise direction of the lever 200.

At least one protruding rib 312 may be formed near the hollow 311 of the moving portion 310, and at least one rib groove 322 may be formed at the fixing portion 320 at a location that corresponds to the protruding rib 312. The protruding rib 312 may be formed to protrude toward the fixing portion 320 and may be inserted into the rib groove 322. Accordingly, when the location of at least one of the moving portion 310 and the fixing portion 320 is changed, the moving direction of the moving portion 310 and the fixing portion 320 may be guided by the protruding rib 312 and the rib groove 322.

The protruding rib 312 may be formed at the moving portion 310, and the rib groove 322 may be formed at the fixing portion 320. However, the present disclosure is not limited to thereto and the protruding rib 312 may be formed at one of the moving portion 310 and the fixing portion 320, and the rib groove 322 may be formed at the other one of the moving portion 310 and the fixing portion 320. The moving portion 310 and the fixing portion 320 may be connected to each other, with the protruding rib 312 inserted in the rib groove 322, by at least one elastic member 330, to which the moving portion 310 and the fixing portion 320 are coupled.

Further, a plurality of fixing grooves 313 and 323, into which both ends of the elastic member 330 are inserted, may be formed at the moving portion 310 and the fixing portion 320, respectively. When an external force is applied in a state where both ends of the elastic member 330 are inserted in the fixing grooves 313 and 323 of the moving portion 310 and the fixing portion 320, the elastic member 330 may be elastically deformed, and as a result, the moving portion 310 and the fixing portion 320 may be separated from each other. Then, when the elastic force is removed, the moving portion 310 and the fixing portion 320 may be returned to original locations due to the restoring force of the elastic member 330. When the moving portion 310 and the fixing portion 320 are separated from each other in response to the elastic member 330 being elastically deformed, the moving direction of the moving portion 310 and the fixing portion 320 may be guided since the protruding rib 312 is inserted in the rib groove 322.

Moreover, the lever 200 may include a rod 210, which penetrates the lever 200 in a direction perpendicular to the lengthwise direction of the lever 200. The rod 210 may be disposed between the moving portion 310 and the fixing portion 320. When the lever 200 is operated in the first gear shift sensing mode, the rod 210, which is disposed between the moving portion 310 and the fixing portion 320, may be rotated about the first rotational axis Ax1 and may thus operate as the rotational axis of the lever 200. When the lever 200 is operated in the second gear shift sensing mode, the rod 210 may be rotated about the second rotational axis Ax2 and may thus create an operation feeling. The creation of the operation feeling when the lever 200 is operated in the second gear shift sensing mode will be described later. The rod 210 may include a coupling member 211 coupled to a roller 500, at one end thereof. The roller 500 may be installed to be rotatable about the first rotational axis Ax1 when the lever 200 is moved to the first position by the lever moving unit 300.

In addition, the roller 500 may include a coupling groove 510, into which the coupling member 211 may be inserted. When the lever 200 is moved to the first position by the lever moving unit 300, the coupling groove 510 may be inserted into the coupling member 511. Thus, in response to the lever 200 being rotated about the first rotation axis Ax1, the roller 500 may be rotated together with the lever 200. When the coupling member 211 is inserted into the coupling groove 510, the coupling member 211 may remain connected to the rod 210 through a communicating groove 511, which communicates with the coupling groove 510.

Figure 8:
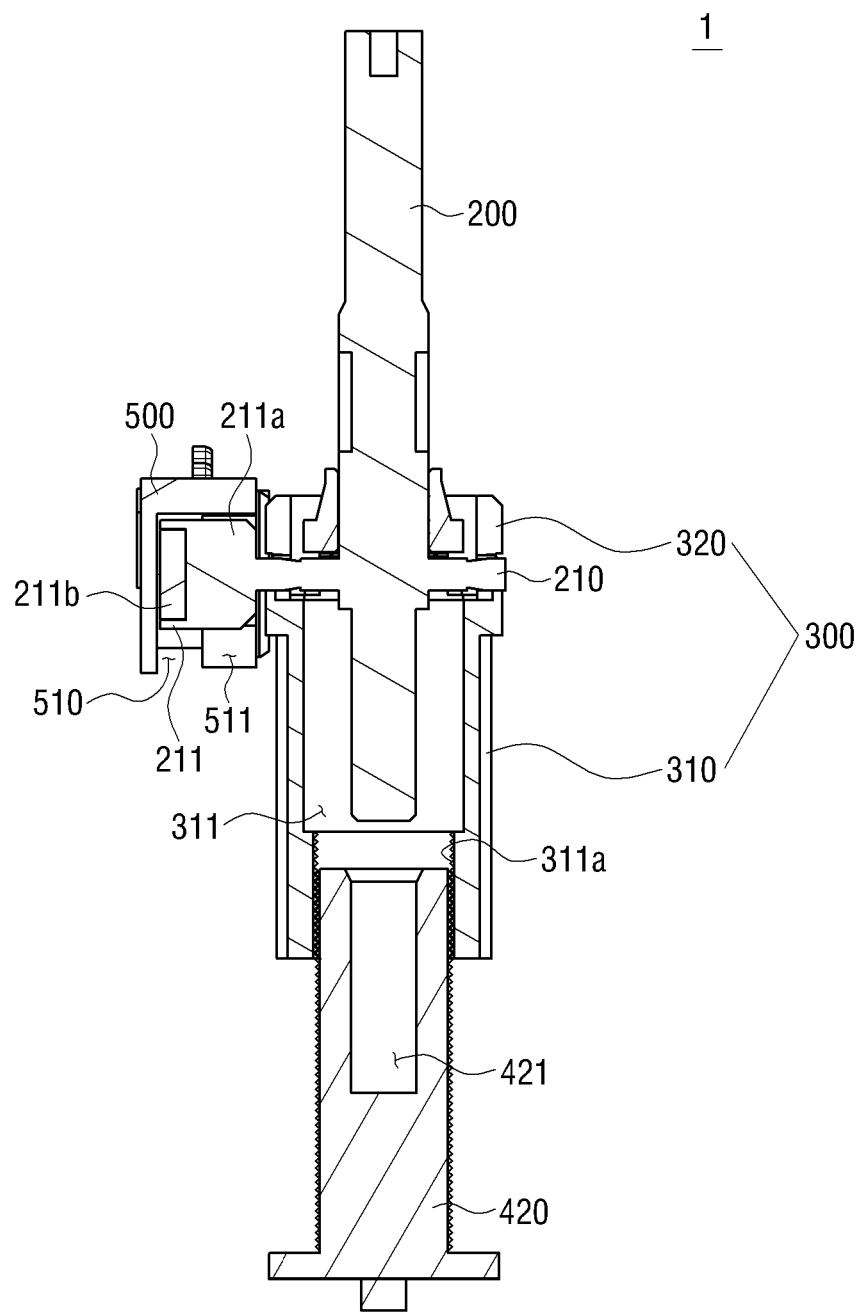
FIG. 8 is a cross-sectional view illustrating the location of a lever in a first gear shift sensing mode according to an exemplary embodiment of the present invention.

In particular, the communicating groove 511 may be formed to extend along the moving direction of the rod 210 when the lever 200 is moved to the first position by the lever moving unit 300, and may guide the coupling member 211 to be inserted into the coupling groove 510, as illustrated in FIG. 8. A contact member 211a, disposed in surface contact with the inside of the communicating groove 511, may be formed at one side of the coupling member 211. Thus, when the coupling member 211 is inserted in the coupling groove 510, the lever 200 may be prevented from being rotated about the second rotational axis Ax2. In other words, the roller 500 may be installed in the housing 10 to be rotatable about the first rotational axis Ax1 and to have a fixed location. Thus, when the coupling member 211 is inserted in the coupling groove 510, the lever 200 may be prevented from being rotated about the second rotational axis Ax2.

The coupling member 211 may include a magnet 211b and when the lever 200 is rotated about the second rotational axis Ax2, the magnet 211b may be rotated together with the coupling member 211, thereby causing a variation in a magnetic force. The variation in the magnetic force may be sensed by a detection sensor such as a three-dimensional (3D) Hall sensor and may be used to determine the location and the amount of rotation of the lever 200 when the lever 200 is operated in the second gear shift sensing mode. This will be described later in further detail.

A detent groove 520 may be formed at the outer circumferential end of the roller 500. The detent groove 520 may be disposed in contact with a bullet 530, which is disposed adjacent to the roller 500. In particular, the detent groove 520 may be formed such that its contact surface with the bullet 530 does not have a uniform slope as a whole, but has different slopes from one section to another section thereof. Accordingly, when the driver rotates the lever 200 about the first rotational axis Ax1, the amount of force required to operate the lever 200 may vary from one section to another section of the detent groove 520 thus creating the operation feeling for a driver. In other words, the driver may be capable of feeling differences in the operation of the lever.

The point of contact of the bullet 530 on the contact surface of the detent groove 520 may vary based on the rotation angle of the lever 200, which is rotated about the first rotational axis Ax1, with respect to the initial location of the bullet 530. The contact surface of the detent groove 520 may have an oblique shape that gradually becomes distant from the center of rotation of the roller 500, i.e., the first rotational axis Ax1, in a direction from a first side to a second side thereof, and thus, as the rotation angle of the lever 200, which is rotated about the first rotational axis Ax1, increases, the force applied to the bullet 530 may gradually increase.

The bullet 530 may be elastically supported by an elastic body such as a spring to thus create the operation feeling when the roller 500 is rotated. As the rotation angle of the lever 200, which is rotated about the first rotational axis Ax1, increases, the compression rate of the elastic body increases, and as a result, a relatively substantial restoring force is generated. Thus, a substantial amount of force is required to rotate the lever 200 about the first rotational axis Ax1 by a substantial angle. Accordingly, the driver may be able to recognize the rotation angle of the lever 200 for selecting a desired gear stage.

The contact surface of the detent groove 520 may be inclined from the center to both ends thereof and may thus be substantially V-shaped in consideration that the lever 200 may be rotated in both directions about the first rotational axis Ax1 when operated in the first gear shift sensing mode. In particular, the initial location of the bullet 530 in the first gear shift sensing mode may be understood as being the center of the detent groove 530, i.e., a location on the contact surface of the detent groove 520 that is closest to the center of rotation of the roller 500.

Figure 9:
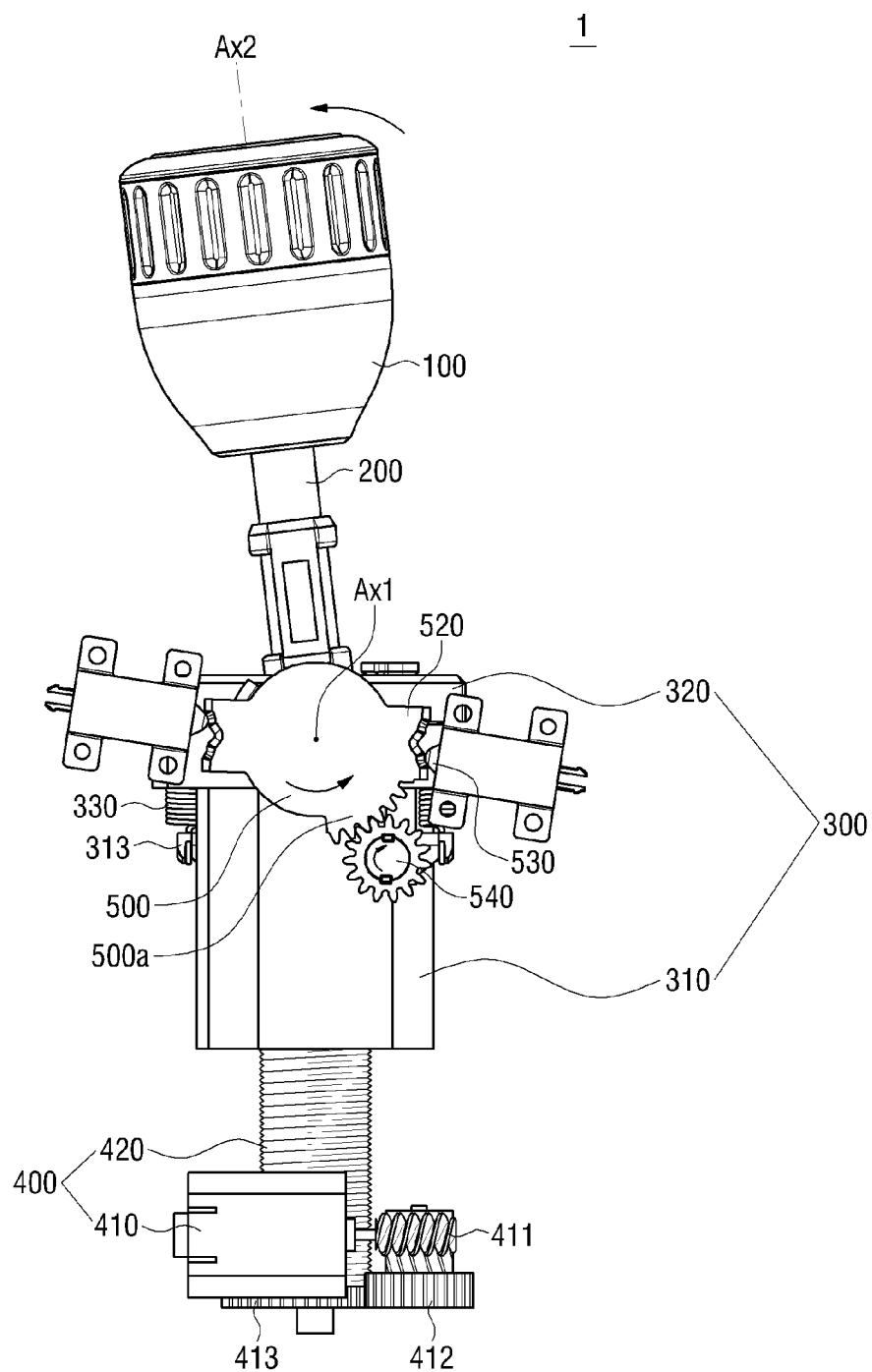
FIG. 9 is a side view illustrating the rotation of the lever in the first gear shift sensing mode according to an exemplary embodiment of the present invention.

As already mentioned above, since the roller 500 is installed to be rotatable about the first rotational axis Ax1, the lever 200 may be prevented from being rotated about the second rotational axis Ax2 when the coupling groove 510 is inserted in the coupling member 211, as illustrated in FIG. 8. As a result, the lever 200 may be operated in the first gear shift sensing mode. In particular, a desired gear stage may be selected by rotating the lever 200 about the first rotational axis Ax1, as illustrated in FIG. 9.

When the lever 200 is rotated about the first rotational axis Ax1 by a force applied by the driver and as a result, a gear stage is selected, the elastic body that elastically supports the bullet 530 may be compressed by the contact surface of the detent groove 520. Then, when the force applied by the driver is removed, the roller 500 may be rotated by the restoring force of the elastic body that elastically supports the bullet 530. As a result, as illustrated in FIG. 4, the lever 200 may be returned to an original location or position, and the bullet 530 may also be returned to an original location, i.e., the center of the detent groove 520.

In other words, different gear stages may be selected based on the rotation angle of the lever 200, which is rotated about the first rotational axis Ax1, and when the position of a gear stage selected by the lever 200 is maintained, a space required for a gear shift operation may increase (e.g., an accommodation space preventing interference with other components). However, once the force applied by the driver is removed or released after the selection of a gear stage, the lever 200 is returned to an original location. Thus, the space required for a gear shift operation may be reduced, which is advantageous for the reduction of the size and weight of the automotive transmission 1.

Furthermore, gear teeth 500a may be formed at the outer circumferential end of the roller 500 to be engaged with a magnet gear 540, which is disposed adjacent to the outer circumferential end of the roller 500. The magnet gear 540 may include a magnet with a varying location due to the rotation of the roller 500, thus having a varying magnetism accordingly. The change of the magnetism of the magnet based on the location of the magnet may be sensed by the detection sensor such as a 3D Hall sensor and may be used to determine the location and the amount of rotation of the lever 200. The result of sensing performed by the detection sensor may be transmitted to a controller (not illustrated) configured to adjust the state of the vehicle, and the controller may be configured to transmit a control signal to the automotive transmission 1 to perform a shift to a gear stage selected by the lever 200 based on the sensed result by the detection sensor.

The lever moving unit 300 may be lowered by a driving force generated by the driving unit 400 and may thus move the lever 200 from the first position to the second position. The driving unit 400 may include an actuator 410 and a lead screw 420. The actuator 410 may be configured to generate a driving force for moving the lever moving unit 300. The driving force generated by the actuator 410 may be transmitted to the lead screw 420 via at least one transmission gear, i.e., transmission gears 411, 412, and 413. The lead screw 420 may be rotated by the driving force generated by the actuator 410. Gear teeth 311a, which are engaged with the lead screw 420, may be formed on at least part of the inner surface of the hollow 311 of the moving portion 310 of the lever moving unit 300, and as a result, the lever moving unit 300 may be moved based on the rotation direction of the lead screw 420.

Additionally, an insertion groove 421 may be formed at the lead screw 420. When the lever moving unit 300 is lowered to move the lever 200 from the first position to the second position, the lever 200 may be inserted into the insertion groove 421. Once the lever 200 is inserted in the insertion groove 421, the lever 200 may be prevented from being rotated about the first rotational axis Ax1 and may be rotated about the second rotational axis Ax2. As a result, the lever 200 may be placed in a state of being operable in the second gear shift sensing mode.

The driving unit 400 may be fixedly installed in the housing 10 and may allow the lever moving unit 300 to be movable based on the rotation of the lead screw 420. Accordingly, any malfunction that may be caused by electromagnetic waves may be prevented since the location of the driving unit 400, particularly, the location of the actuator 410, may be changed along with the lever moving unit 300, such as failure to detect a variation in the magnetism of the magnet caused by a change of the location of the magnet since of electromagnetic waves generated during the driving of the actuator 410.

Figure 10:
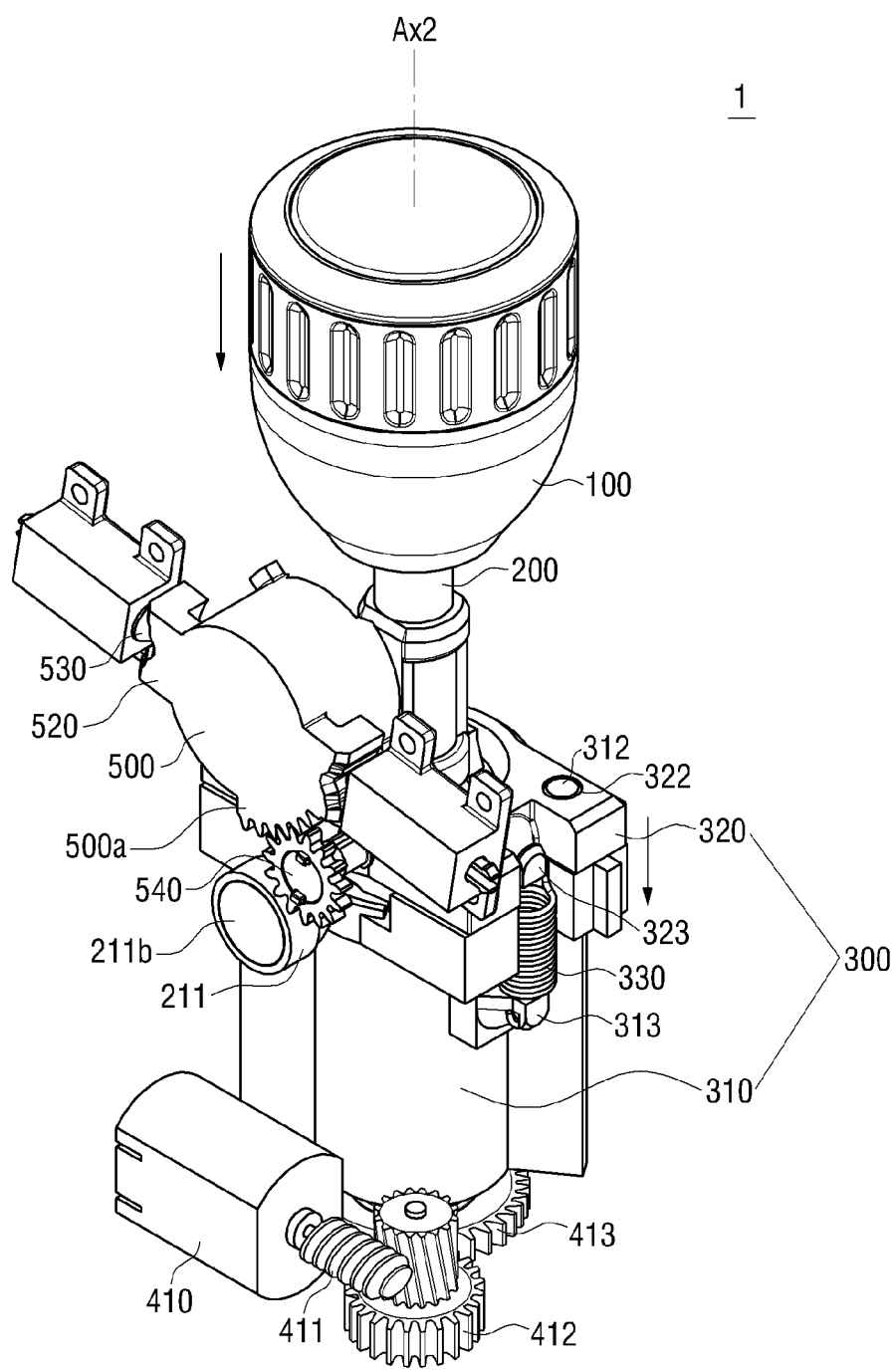
FIG. 10 is a perspective view illustrating the moving direction of the lever in a second gear shift sensing mode according to an exemplary embodiment of the present invention.
Figure 11:
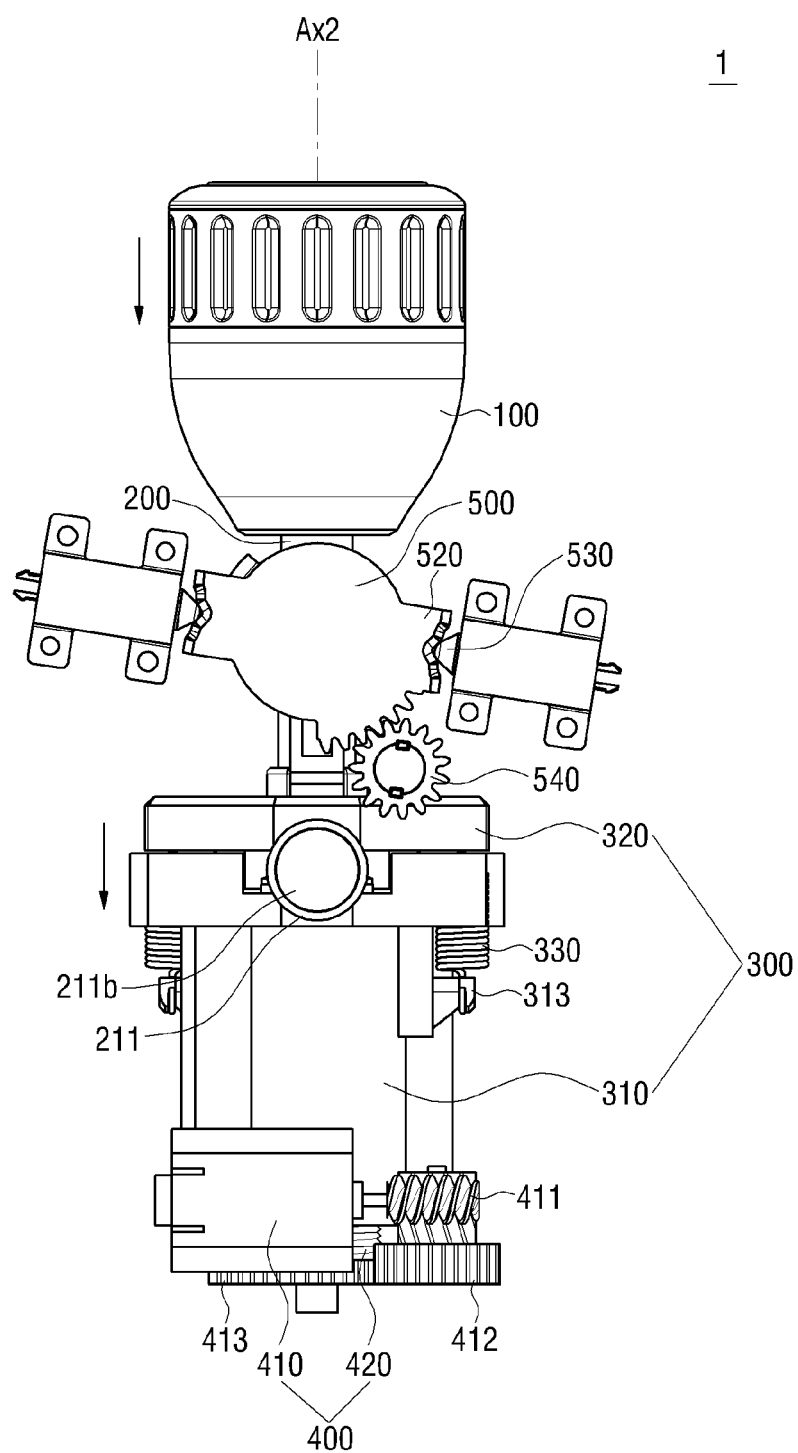
FIG. 11 is a side view illustrating the moving direction of the lever in the second gear shift sensing mode according to an exemplary embodiment of the present invention.
Figure 12:
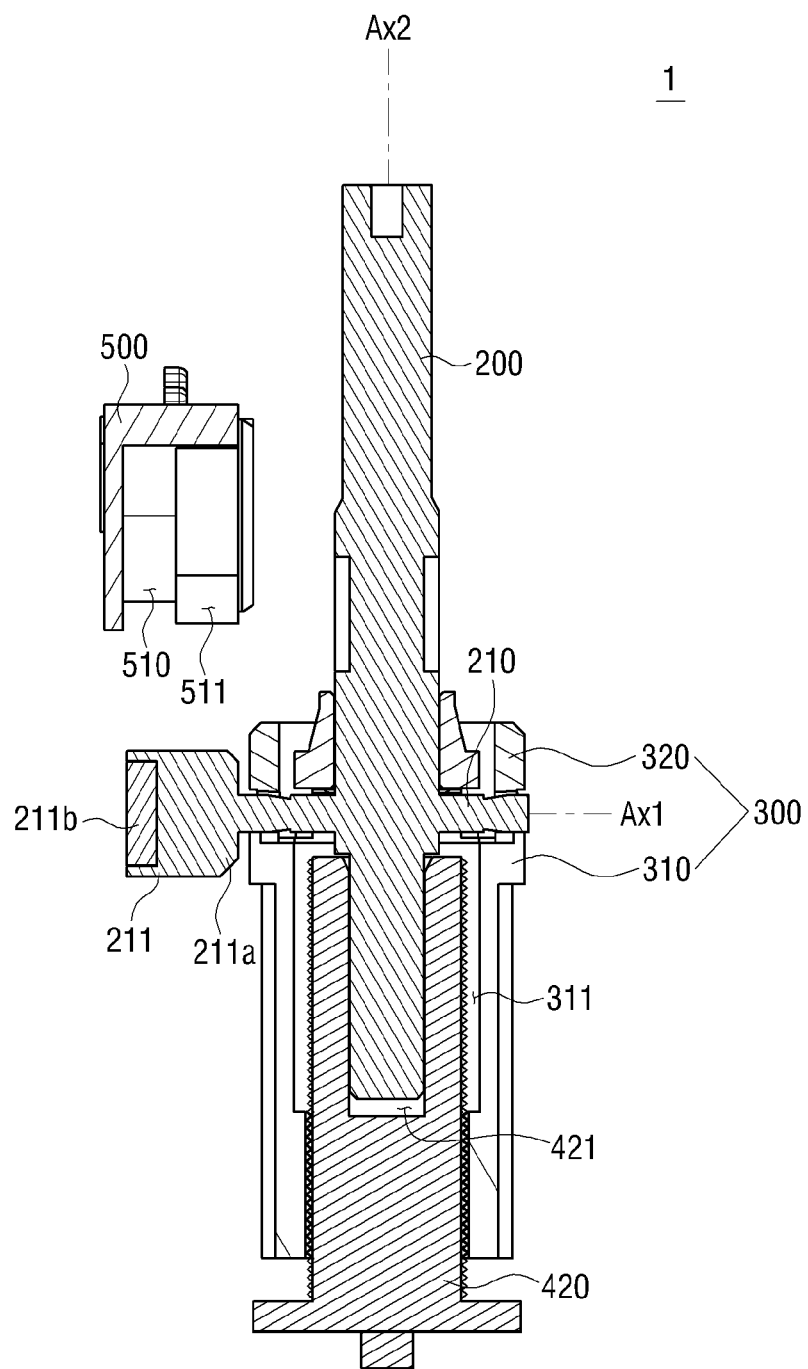
FIG. 12 is a cross-sectional view illustrating the location of the lever in the second gear shift sensing mode according to an exemplary embodiment of the present invention.

When the lever moving unit 300 is lowered by the driving unit 400, the lever 200 may be moved from the first position to the second position, as illustrated in FIGS. 10 and 11. In particular, the coupling member 211, which is provided at one end of the rod 210, may be separated from the coupling groove 510 of the roller 500 for the lever 200 to become rotatable about the second rotational axis Ax2, and at the same time, the lever 200 may be inserted into the insertion groove 421 of the lead screw 420, as illustrated in FIG. 12. As a result, the lever 200 may be prevented from being rotated about the first rotational axis Ax1 and may thus be operated in the second gear shift sensing mode.

Figure 13:
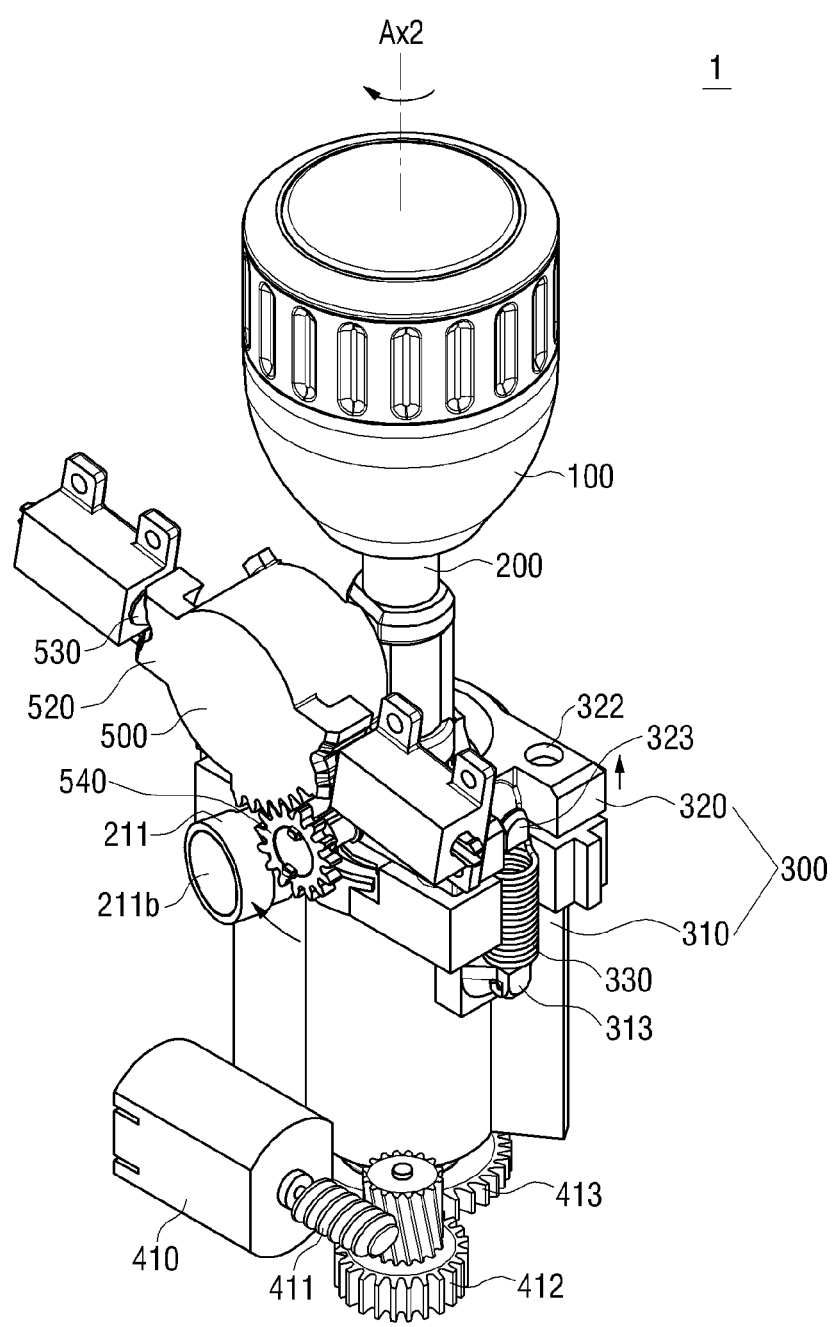
FIGS. 13 and 14 are perspective views illustrating the rotation of the lever in the second gear shift sensing mode according to an exemplary embodiment of the present invention.

When the lever 200 is rotated about the second rotational axis Ax2, the lever 200 and the rod 210 disposed at the lever 200, may be rotated about the second rotational axis Ax2. When the rod 210 is rotated about the second rotational axis Ax2, the coupling member 211, disposed at one end of the rod 210, may also be rotated about the second rotational axis Ax2, as illustrated in FIG. 13, and as a result, a variation in the magnetism of the magnet 211b of the coupling member 211 occurs due to a change of the location of the magnet 211b. The variation in the magnetism of the magnet 211b may be sensed by the detection sensor and may be used to determine the location and the amount of rotation of the lever 200.

Additionally, when the rod 210 is rotated about the second rotational axis Ax2 together with the lever 200, the operation feeling may be created by the detent groove 324 of the fixing portion 320. As already mentioned above, the detent groove 324 may be formed at the fixing portion 320, but the present disclosure is not limited thereto. In other words, the detent groove 324 may be formed at at least one of the moving portion 310 and the fixing portion 320.

Figure 14:
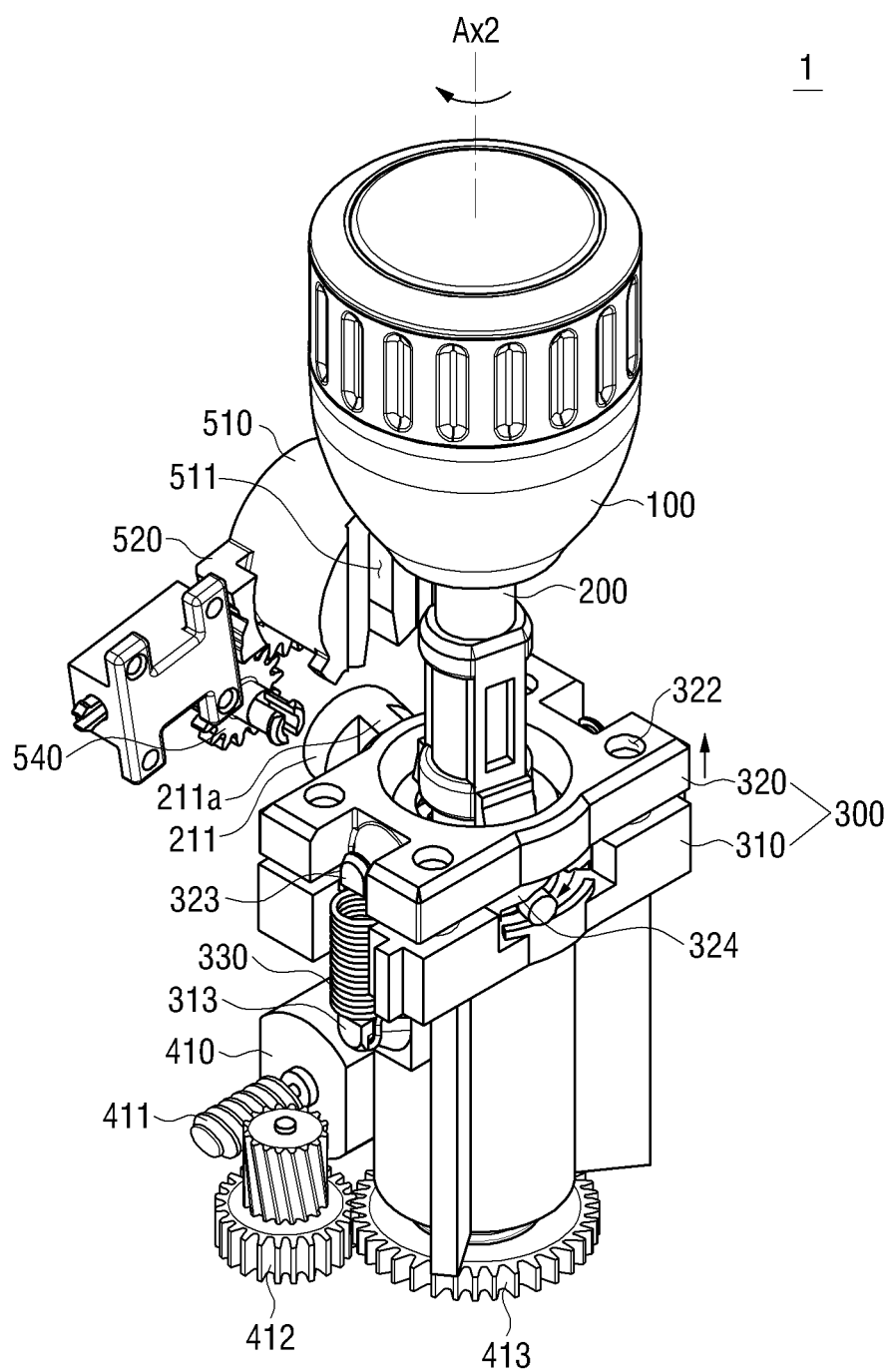
Figure 15:
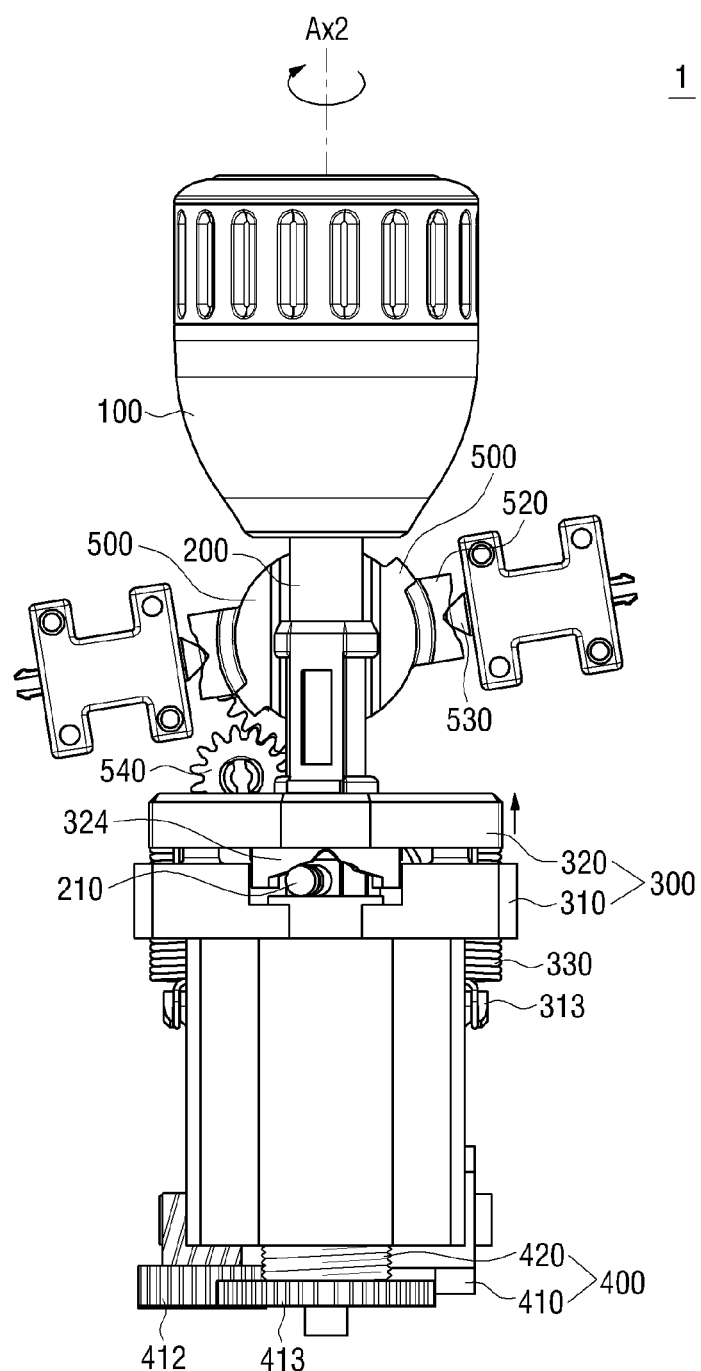
FIG. 15 is a side view illustrating the rotation of a rod in the second gear shift sensing mode according to an exemplary embodiment of the present invention.

As already mentioned above, the moving portion 310 and the fixing portion 320 may be coupled by the elastic member 330. Thus, in response to the lever 200 being rotated about the second rotational axis Ax2, the rod 210 may also be rotated about the second rotational axis Ax2 and may thus apply a force to separate the moving portion 310 and the fixing portion 320 from each other, as illustrated in FIGS. 14 and 15. In particular, the elastic member 330 may be elastically deformed by the rod 210 and thus, the moving portion 310 and the fixing portion 320 may be separated from each other. The protruding rib 312 may be formed at the moving portion 310, and the rib groove 322 may be formed at the fixing portion 320. Thus, in response to the rod 210 being rotated to apply a force to separate the moving portion 310 and the fixing portion 320 from each other, the elastic member 330 may be elastically deformed to move the fixing portion 320 along the lengthwise direction of the lever 200.

The contact surface of the detent groove 324 with the rod 210 may be formed not to have a uniform slope as a whole, but to have different slopes from one section to another section thereof, and the moving portion 310 and the fixing portion 320 may be coupled by the elastic member 330. Thus, the rod 210 may be rotatable in a swinging manner, and as a result, the operation feeling may be created. Accordingly, when the driver rotates the lever 200 about the second rotational axis Ax2, the amount of force required to operate the lever 200 may vary from one section to another section of the detent groove 324 and thus, the operation feeling may be created. The point of contact of the rod 210 on the contact surface of the detent groove 324 may vary based on the rotation angle of the lever 200, which is rotated about the second rotational axis Ax2, with respect to the initial location of the rod 210. The contact surface of the detent groove 324 may have an oblique shape that gradually becomes distant from the end of lever 200 in a direction from a first side to a second side thereof.

Since the moving portion 310 and the fixing portion 320 may be coupled by the elastic member 330, as the rotation angle of the rod 210, which is rotated about the second rotational axis Ax2, increases, the distance between the moving portion 310 and the fixing portion 320 increases, and as a result, the restoring force generated by the elastic member 330 also increases. Accordingly, a substantial amount of force is required to rotate the lever 200 about the second rotational axis Ax2 by a substantial angle. Thus, the driver may be able to recognize the rotation angle of the lever 200 for selecting a desired gear stage.

The contact surface of the detent groove 324 may be inclined from the center to both ends thereof and may thus be substantially V-shaped in consideration that the lever 200 may be rotated in both directions about the second rotational axis Ax2 when operated in the second gear shift sensing mode. In particular, the initial location of the rod 210 in the second gear shift sensing mode may be understood as being the center of the detent groove 324, i.e., a location on the contact surface of the detent groove 324 that is closest to the end of the lever 200.

When the rod 210 of the lever 200 is rotated about the second rotational axis Ax2 by a force applied by the driver, the elastic member 330 may be elastically deformed by the contact surface of the detent groove 324 and may thus generate a restoring force. Then, when the force applied by the driver is removed or released, the rod 210 may be returned to an original location, i.e., the center of the detent groove 324, due to the restoring force of the elastic member 330, and as a result, the lever 200 may be returned to an original location. A mode switch is required to operate the lever 200 in any one of the first and second gear shift sensing modes. Accordingly, a mode switch button 610 may be disposed at a cover 600 disposed between the knob 100 and the lever moving unit 300, as illustrated in FIGS. 16 and 17.

Figure 16:
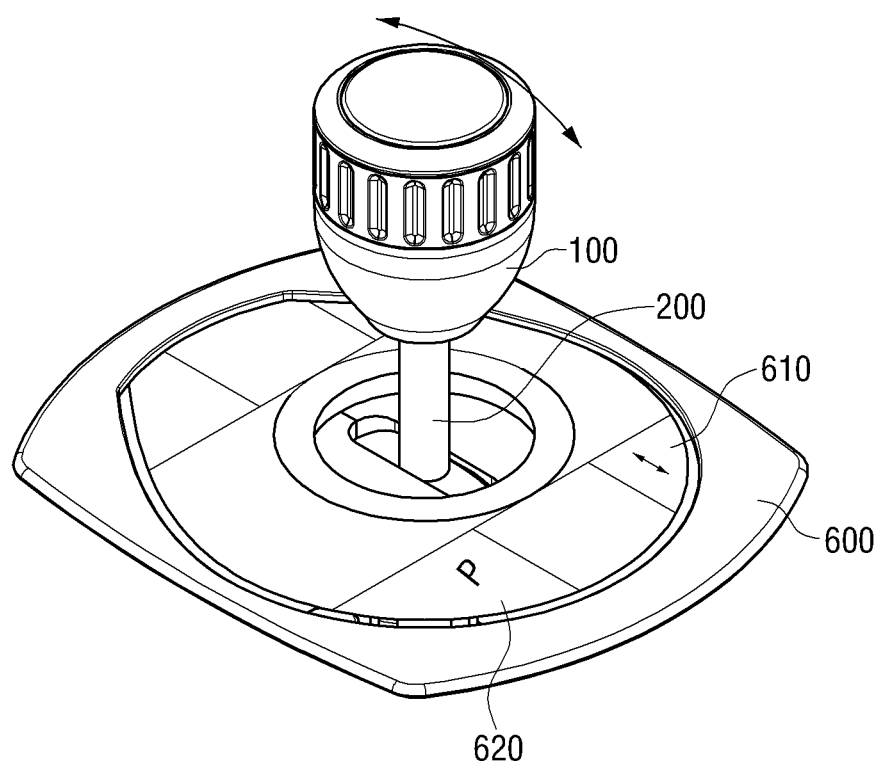
FIGS. 16 and 17 are perspective views of a cover according to an exemplary embodiment of the present invention.
Figure 17:
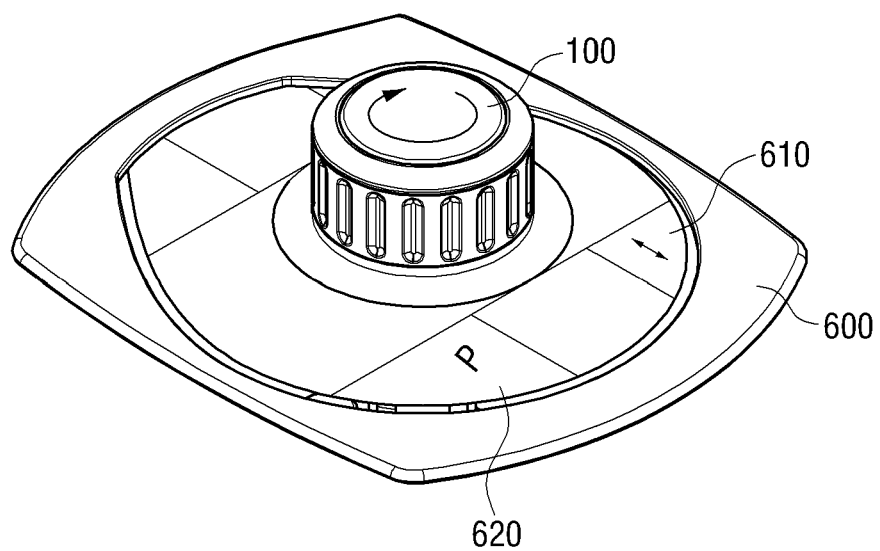

FIG. 16 illustrates an example in which the lever 200 is moved to the first position, and FIG. 17 illustrates an example in which the lever 200 is moved to the second position. The driver may select one of the first and second gear shift sensing modes by pressing or otherwise engaging the mode shift button 610. A manipulation signal from the mode shift button 610 may be transmitted to the driving unit 400 via the controller to move the lever moving unit 300 in a vertical direction and thus to select one of the joystick mode and the rotary mode. As already mentioned above, the mode shift button 610 may be disposed at the cover 600, but the present disclosure is not limited thereto. Various other types of buttons for executing a variety of functions for a gear shift operation such as a park button 620 corresponding to a park (P) stage may also be disposed at the cover 600.

While exemplary embodiments are described above, it is not intended that these exemplary embodiments describe all possible forms of the present invention. Rather, the words used in the specification are words of description rather than limitation, and it is understood that various changes may be made without departing from the spirit and scope of the present invention. Additionally, the features of various implementing exemplary embodiments may be combined to form further exemplary embodiments of the present invention.

What is claimed is:

1. An automotive transmission, comprising:
   a knob;
   a lever vertically movable from a first position to a second position;
   a lever moving unit coupled to the lever; and
   a driving unit configured to generate a driving force for moving the lever moving unit,
   wherein the lever moving unit moves the lever between the first position, which is for operating the lever in a first gear shift sensing mode, and the second position, which is for operating the lever in a second gear shift sensing mode, based on the driving force generated by the driving unit, and
   wherein the automotive transmission further comprising:
      a rod that penetrates the lever in a direction perpendicular to a lengthwise direction of the lever, wherein the lever is rotated about a first rotational axis that corresponds to the rod in the first gear shift sensing mode;
      a coupling member disposed at one end of the rod, wherein the coupling member is inserted into a coupling groove, which is formed at a roller that is rotatable with the rod about the first rotational axis, when the lever is moved to the first position; and a detection sensor configured to detect a variation in magnetism due to a rotation of the roller in the first gear shift sensing mode.

2. The automotive transmission of claim 1, wherein in the first gear shift sensing mode, the lever is rotated about the first rotational axis perpendicular to the lengthwise direction of the lever, and in the second gear shift sensing mode, the lever is rotated about a second rotational axis parallel to the lengthwise direction of the lever.

3. The automotive transmission of claim 1, wherein the lever moving unit includes a moving portion, which is movable by the driving unit, and a fixing portion, which is coupled to the moving portion for the lever to be coupled to the lever moving unit.

4. The automotive transmission of claim 3, wherein one of the moving portion and the fixing portion includes at least one protruding rib, which protrudes in the lengthwise direction of the lever, and the other one of the moving portion and the fixing portion includes at least one rib groove, into which the at least one protruding rib is inserted.

5. The automotive transmission of claim 3, wherein the driving unit includes an actuator and a lead screw, which is engaged with the moving portion, and the lead screw is disposed in the moving portion.

6. The automotive transmission of claim 1,
wherein the detection sensor is configured to sense the variation in magnetism caused by a rotation of a magnet gear, which is engaged with the roller, and
wherein the detection sensor is configured to detect the variation in magnetism in the first gear shift sensing mode.

7. The automotive transmission of claim 1, wherein the roller includes a communicating groove, which communicates with the coupling groove and is formed to extend in a moving direction of the rod, and the coupling member includes a contact member, which is disposed in surface contact with at least part of the communicating groove, at one side thereof.

8. The automotive transmission of claim 1, wherein a detent groove is formed at at least part of an outer circumferential end of the roller to be placed in contact with a bullet, which is disposed adjacent to the roller, and the bullet is elastically supported s to be swingable in accordance with the shape of a contact surface of the detent groove.

9. The automotive transmission of claim 8, wherein the contact surface of the detent groove has an oblique shape with multiple slopes.

10. The automotive transmission of claim 1, wherein the rod is disposed between the moving portion and the fixing portion, and the moving portion and the fixing portion are coupled to each other by at least one elastic member, which has both ends fixed to the moving portion and the fixing portion.

11. The automotive transmission of claim 10, wherein in the second gear shift sensing mode, the rod is rotated to separate the moving portion and the fixing portion and thus to elastically deform the at least one elastic member.

12. The automotive transmission of claim 11, wherein the fixing portion includes a detent groove, which is placed in contact with the rod, and the rod is rotated to be swingable along a contact surface of the detent groove.

13. The automotive transmission of claim 12, wherein the contact surface of the detent groove has an oblique shape with multiple slopes.

14. The automotive transmission of claim 1, wherein the driving unit is fixedly installed in a housing.

15. The automotive transmission of claim 1, further comprising:
a cover disposed between the knob and the lever moving unit,
wherein the cover includes a mode switch button that switches the lever between the first and second gear shift sensing modes.

16. An automotive transmission, comprising:
a knob;
a lever vertically movable from a first position to a second position;
a lever moving unit coupled to the lever; and
a driving unit configured to generate a driving force for moving the lever moving unit,
wherein the lever moving unit moves the lever between the first position, which is for operating the lever in a first gear shift sensing mode, and the second position, which is for operating the lever in a second gear shift sensing mode, based on the driving force generated by the driving unit, and
wherein the automotive transmission further comprising:
a rod that penetrates the lever in a direction perpendicular to a lengthwise direction of the lever, wherein the lever is rotated about a first rotational axis that corresponds to the rod in the first gear shift sensing mode;
a coupling member disposed at one end of the rod, wherein the coupling member is inserted into a coupling groove, which is formed at a roller that is rotatable with the rod about the first rotational axis, when the lever is moved to the first position; and
a detection sensor configured to sense a variation in magnetism caused by a magnet, which is disposed at the coupling member, wherein the detection sensor is configured to sense a the variation in magnetism in the second gear shift sensing mode.

17. An automotive transmission, comprising:
a knob;
a lever vertically movable from a first position to a second position;
a lever moving unit coupled to the lever; and
a driving unit configured to generate a driving force for moving the lever moving unit,
wherein the lever moving unit moves the lever between the first position, which is for operating the lever in a first gear shift sensing mode, and the second position, which is for operating the lever in a second gear shift sensing mode, based on the driving force generated by the driving unit,
wherein the lever moving unit includes a moving portion, which is movable by the driving unit,
wherein the driving unit includes an actuator and a lead screw, which is engaged with the moving portion, and the lead screw is disposed in the moving portion, and
wherein the lead screw includes an insertion groove, into which the lever is inserted when the lever is moved to the second position.

18. An automotive transmission, comprising:
a knob;
a lever vertically movable from a first position to a second position;
a lever moving unit coupled to the lever; and
a driving unit configured to generate a driving force for moving the lever moving unit,
wherein the lever moving unit moves the lever between the first position, which is for operating the lever in a first gear shift sensing mode, and the second position, which is for operating the lever in a second gear shift sensing mode, based on the driving force generated by the driving unit, wherein the driving unit includes a lead screw that is engaged with the lever moving unit to transmit the driving force, and wherein the lever moving unit and the lead screw are disposed along a same axis, and a rotational motion of the lead screw is translated to a linear motion of the lever moving unit.

* * * * *